United States Patent [19]

Miura

[11] 4,428,464
[45] Jan. 31, 1984

[54] HYDRAULIC DAMPER

[75] Inventor: Ieaki Miura, Yokohama, Japan

[73] Assignee: Tokico Ltd., Kanagawa, Japan

[21] Appl. No.: 305,844

[22] Filed: Sep. 25, 1981

[30] Foreign Application Priority Data

Sep. 26, 1980 [JP] Japan .............................. 55-136981[U]

[51] Int. Cl.³ .............................................. F16F 9/34
[52] U.S. Cl. ................................ 188/315; 137/543.19;
188/322.14; 188/322.15
[58] Field of Search ........... 188/282, 315, 317, 322.14,
188/322.15; 137/543.19

[56] References Cited

U.S. PATENT DOCUMENTS

| 2,320,697 | 6/1943 | Binder | 188/322.14 |
|---|---|---|---|
| 3,763,970 | 10/1973 | Anderson | 188/282 |
| 4,238,009 | 12/1980 | Wossner et al. | 188/315 |
| 4,298,102 | 11/1981 | Nishikawa et al. | 188/322.15 X |

FOREIGN PATENT DOCUMENTS

| 929174 | 6/1959 | Fed. Rep. of Germany | 137/543.19 |
|---|---|---|---|
| 1204646 | 8/1959 | France | 137/543.19 |
| 278622 | 10/1930 | Italy | 137/543.19 |
| 56-49438 | 5/1981 | Japan | 188/315 |
| 2015693 | 9/1979 | United Kingdom | 188/322.14 |

Primary Examiner—George E. A. Halvosa
Attorney, Agent, or Firm—Wenderoth, Lind & Ponack

[57] ABSTRACT

A hydraulic damper includes coaxial inner and outer tubes, a piston working in the inner tube and partitioning the interior thereof into first and second liquid chambers, a piston rod secured to the piston and extending through the first liquid chamber to the outside of the damper through upper ends thereof, a rod guide supporting the upper ends of the inner and outer tubes and slidably guiding the piston rod, a base cap supporting the lower ends of the inner and outer tubes, a reservoir chamber defined between the inner and outer tubes and containing therein liquid and gas, and a bottom valve mechanism mounted on the lower end of the inner tube for controlling liquid flow between the second liquid chamber and the reservoir chamber. The bottom valve mechanism comprises a valve seat mounted on the lower end of the inner tube, a rigid valve body having an orifice passage, a spring biasing the valve body toward the valve seat, and an inverted U-shaped valve guide guiding the movement of the valve body toward and away from to the valve seat.

1 Claim, 10 Drawing Figures

HYDRAULIC DAMPER

BACKGROUND OF THE INVENTION

This invention relates to a hydraulic damper and, particularly to a hydraulic damper of the kind including generally vertically disposed coaxial inner and outer tubes, a piston working in the inner tube and partitioning the interior thereof into first and second liquid chambers, a piston rod secured to the piston and extending through the first liquid chamber to the outside of the damper through upper ends of the inner and outer tubes, a rod guide supporting the upper ends of the inner and outer tubes and slidably guiding the piston rod, a base cap supporting the lower ends of the inner and outer tubes, and a reservoir chamber defined between the inner and outer tubes and containing therein liquid and gas.

In a hydraulic damper of the kind aforementioned, the damping function is performed by forcibly flowing the liquid through a restricted passage. For obtaining desired damping forces both in the extension and contraction strokes of the piston rod, a high pressure gas is usually enclosed in the reservoir chamber. However, the pressure of the gas enclosed in the damper may sometimes decrease during long period of usage. Thus, it has been requested to provide a countermeasure to compensate for the decrease in the pressure of the gas enlcosed in the damper.

One prior art hydraulic damper of the kind aforementioned comprises a bottom valve mechanism mounted on the inner end of the inner tube to control liquid flow between the second chamber and the reservoir chamber, and the bottom valve consists of a resilient annular disc with the inner and outer circumferences engaging respectively with opposingly facing annular valve seats. In the contraction stroke of the piston rod, the inner circumference of the disc separates from one valve seat to allow liquid flow from the second chamber to the reservoir and, in the extension stroke of the damper, the outer circumference of the disc separates from another corresponding valve seat to permit liquid flow from the reservoir to the second chamber. The damper works satisfactorily, however, there is a shortcoming that the function of the bottom valve depends solely on the resiliency of the disc thereby complicating fabrication and adjustment procedures during mass production.

It is also known to form the bottom valve mechanism of two separate valve members for the extension and contraction strokes. When either one of the two valve members opens, the other valve member closes. The function of the bottom valve mechanism can very easily be adjusted, but it is complicated in construction, and is expensive.

SUMMARY OF THE INVENTION

An object of the invention is to overcome the shortcomings aforementioned and, the hydraulic damper according to the invention comprises a bottom valve mechanism which is of simple construction, easy to assemble and advantageous in durability.

The bottom valve mechanism according to the invention comprises a valve seat mounted on the lower end of the inner tube, a valve body having an orifice passage, a spring biasing the valve body toward the valve seat, and a valve guide guiding the movement of the valve body toward and away from the valve seat.

Preferably, the valve guide is a generally inverted U-shaped member with the lower end being fitted on the valve seat, and has a plurality of axially extending and circumferentially spaced recesses in the outer circumference thereof to define on the inner circumference a plurality of circumferentially spaced guide surfaces for guiding the valve body and to define a plurality of circumferentially spaced liquid passages between the inner circumference thereof and the outer circumference of the valve body. The valve guide further has a plurality of openings in the upper end thereof which open respectively to the liquid passages aforementioned.

BRIEF DESCRIPTION OF THE DRAWINGS

The invention will hereinafter be explained in detail in conjunction with the drawings exemplifying two embodiments of the invention.

In the drawings.

DETAILED DESCRIPTION OF THE PREFERRED EMBODIMENTS

Figure 2:
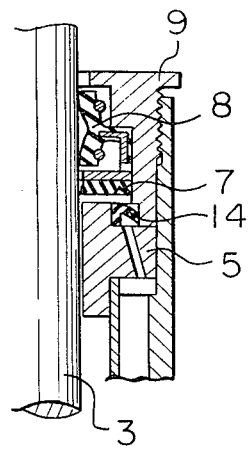
FIG. 2 is an enlarged partial view showing the upper portion of FIG. 1.
Figure 1:
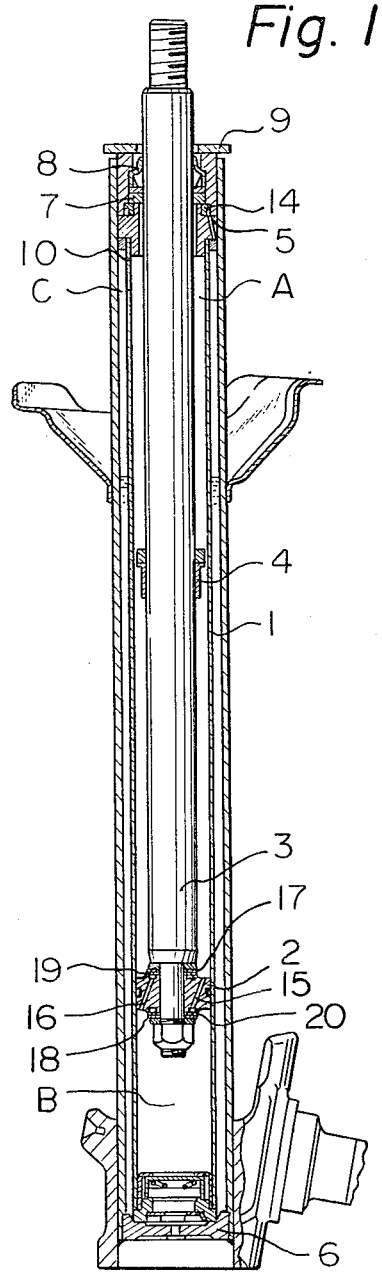
FIG. 1 is a vertical sectional view of a hydraulic damper according to the invention.

FIG. 1 shows a dual tube type hydraulic damper comprising an inner tube 1, a piston 2 working in the inner tube 1 and partitioning the interior thereof into two liquid chambers A and B, a piston rod 3 secured to the piston 2 and extending through the liquid chamber A to the outside of the damper, a stop 4 secured to the piston rod 3, a rod guide 5 slidably guiding the piston rod 3, a cap 6 closing the lower end of the damper, a packing 7 and an oil seal 8 disposed on the upper end of the damper, a cap 9 closing the upper end of the damper, and an outer tube 10 coaxially surrounding the inner tube 1. A reservoir chamber C is defined between the inner and outer tubes 1 and 10 and contains gas and liquid. A check valve 14 prevents the gas in the chamber C from flowing into the upper end of the chamber A through the clearance between the rod guide 5 and the piston rod 3.

A plurality of inclined passages 15 and 16 are provided in the piston 2, and valve members 17 and 18 are provided on the opposite surfaces of the piston 2 to cooperate with the passages 16 and 15 respectively. In the extension stroke of the piston rod 3, the outer circumference of the valve member 17 engages with an annular rim 19 provided on the upper surface of the piston 2, so that the valve member 17 is at a closed position. The outer circumference of the valve member 18 separates from an annular rim 20, which is provided on the lower surface of the piston, so that liquid in the chamber A flows through passages 15 and the clearance between the outer circumference of the valve member 18 and the rim 20 into the chamber B. In the contraction stroke of the piston rod 3, the valve member 17 separates from the rim 19 and the valve member 18 engages with the rim 20, so that the liquid in the chamber B flows into the chamber A through passages 16.

Figure 3:
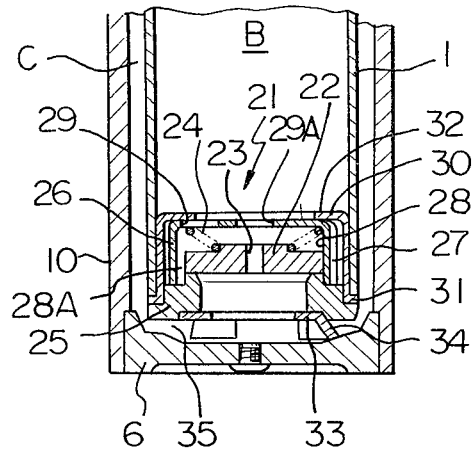
FIG. 3 is an enlarged partial view showing the lower end portion of FIG. 1.
Figure 4:
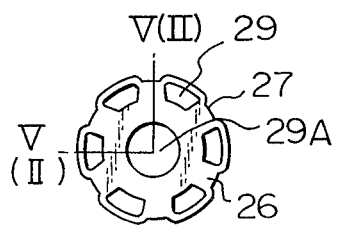
FIG. 4 is a plan view of a valve guide incorporated in the damper of FIG. 3.
Figure 6:
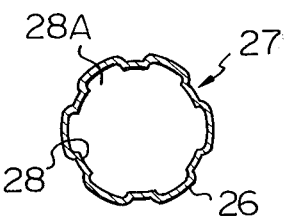
FIG. 6 is a sectional view taken along line VI—VI in FIG. 5.
Figure 5:
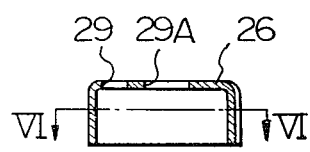
FIG. 5 is a sectional view taken along line V—V in FIG. 4.
Figure 7:
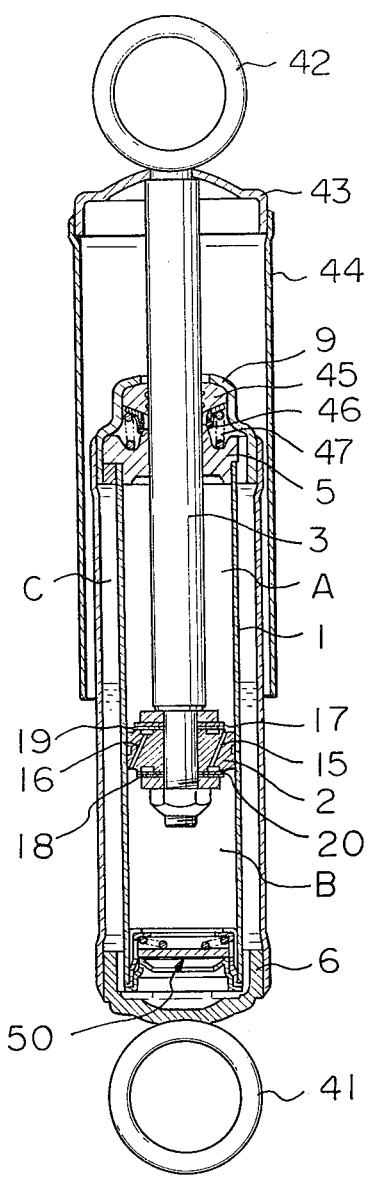
FIG. 7 is a vertical sectional view of a hydraulic damper constituting a second embodiment of the invention.

The damper further includes a bottom valve mechanism 21 between the lower end of the chamber B and the reservoir chamber C. As shown in FIG. 3, the bottom valve mechanism comprises an annular rigid valve body 22 having an orifice opening 23, a coil spring 24 pressing the valve body 22 toward an annular valve seat 25, and a valve guide 26 guiding the movement of the valve body toward and away with respect to the valve seat 25. The valve guide 26 is a generally inverted U-shaped or cup-shaped member including an imperforate axially extending skirt portion having a plurality of axially or vertically extending and circumferentially spaced recesses or indentations 27 in the outer cylindrical circumference thereof to define a plurality of axially extending and circumferentially spaced guide surfaces 28 on the inner circumference thereof and to define a plurality of circumferentially spaced liquid passages 28A between the outer circumference of the valve body 22 and the inner circumference of the valve guide 26. Further, there are provided in the upper end or base portion of the valve guide 26 a central opening 29A and a plurality of circumferentially spaced openings 29 which communicates respectively with the liquid passages 28A. The upper inner end of the valve guide 26 acts as the spring seat for the coil spring 24. The lower ends of the guide surfaces 28 preferably fit with the outer circumference of an upwardly projecting rim of the valve seat 25.

There is provided a generally hat-shaped retainer 30 to retain the valve guide 26 in its position. The retainer 30 has a radially outwardly extending flange 31 in the lower end thereof, and the flange 31 is clamped between the lower end of the inner tube 1 and the valve seat 25 as shown. The retainer 30 has a large central opening in the upper end thereof. In the illustrated embodiment, the valve seat 25 is supported on the base cap 6 through a support 33 having a plurality of circumferentially spaced legs 34 which are supported on the cap 6. The space between the legs 34 define liquid passages 35 communicating with the reservoir chamber C. Thus, the valve mechanism 21 is clamped and located between the lower end of the inner tube 1 and the cap 6.

In operation, when the piston rod 3 is in the extension stroke, the valve member 17 engages with the rim 19 and the valve member 18 separates from the rim 20 so that the oil in the chamber A flows into the chamber B through the passages 15, and a damping force is generated from the kinetic energy of the liquid flow. The pressure in the chamber B decreases owing to the upward movement of the piston 2, and when the force acting on the valve body 22 due to the pressure difference between the chambers B and C exceeds the spring force of the spring 24, the valve body 22 separates from the valve seat 25 so that the oil in the reservoir chamber C flows into the chamber B through the passages 35, the clearance between the valve body 22 and the valve seat 25, the passages 28A between the outer circumference of the valve body 22 and the inner circumference of the valve guide 26 and openings 29 in the valve guide 26.

In the contraction stroke of the piston rod 3, the valve member 18 engages with the rim 20 and the valve member 17 separates from the rim 19 due to the pressure difference between the chambers B and A, thus, the liquid in the chamber B flows into the chamber A through the passages 16 and, at the same time, an amount of the liquid corresponding to the inward movement of the piston rod 3 flows out of the chamber B into the chamber C through the orifice 23 in the valve body 22 which is maintained in engagement with the valve seat 25. By determining suitably the size of the orifice 23, it is possible to reduce the pressure of the gas enclosed in the chamber C, whereby the leakage of the gas from the damper can be compensated, and the service life of the seals in the damper can be elongated.

FIGS. 7-10 show another embodiment of the invention, wherein parts corresponding to those of the embodiment of FIGS. 1-6 are denoted by the same reference numerals. A mounting ring 41 is secured to the base cap 6 by such as welding, and a mounting ring 42 is secured to the upper end of the piston rod 3. The mounting rings 41 and 42 are mounted respectively on such as a wheel axle and a body of a vehicle. A cap 43 and a protecting sleeve 44 are also secured to the upper end of the piston rod 3 to protect the outer tube 10 from damage and to protect the projecting portion of the piston rod 3 from dust. A seal 45, a check valve 46 and a spring 47 are provided in the space between the cap 9 and the rod guide 5.

Figure 8:
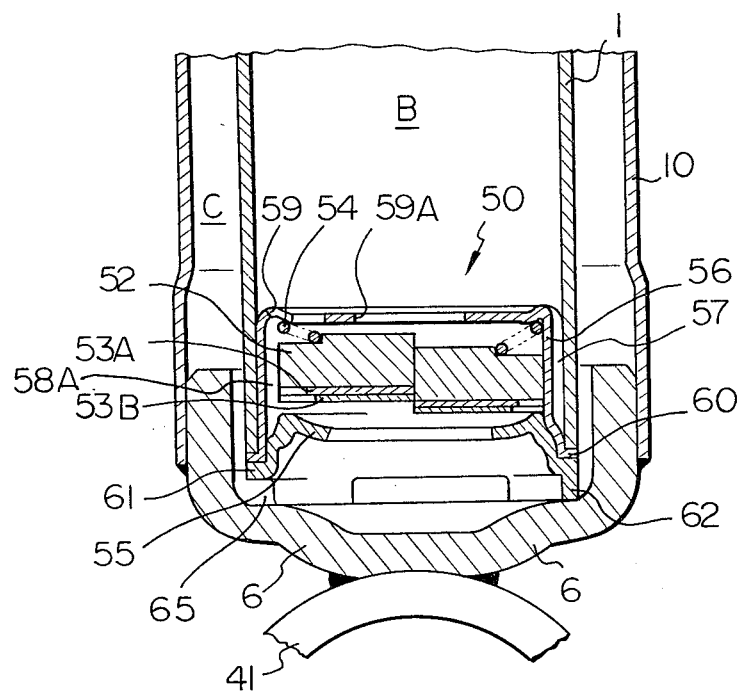
FIG. 8 is an enlarged partial view of the lower end portion of FIG. 7 with the valve body thereof being located at a valve opening condition in the left half of the drawing and at a valve closed condition in the right half of the drawing.
Figure 9:
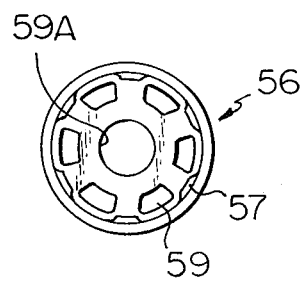
FIG. 9 is a plan view of the valve guide of FIGS. 7 and 8.
Figure 10:
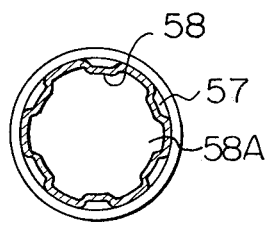
FIG. 10 is a sectional view similar to FIG. 6.

There is provided a bottom valve mechanism 50 on the lower end of the inner tube 1 and between the chambers B and C, and the details of mechanism 50 are shown in FIGS. 8-10.

The valve mechanism 50 comprises a rigid annular valve body 52, one or more thin discs 53A and 53B having a plurality of cut-outs in the outer circumferences thereof and being overlappingly attached to the lower surface of the valve body 52, a spring 54 pressing the valve body 52 toward the closed position, a valve seat 55 cooperating with the valve body 52, and a generally hat-shaped valve guide 56. Similar to the valve guide 26 in the first embodiment, the valve guide 56 has a plurality of circumferentially spaced and axially extending recesses 57 in the outer circumference thereby defining a plurality of circumferentially spaced and axially extending guide surfaces 58 in the inner circumference to guide the movement of the valve body 52 toward and away from the valve seat 55. Further, the recesses 57 also define on the inner circumference thereof a plurality of liquid passages 58A around the outer circumference of the valve body. Liquid passages 58A communicate with corresponding openings 59 which are provided in the upper end of the valve guide 56. The valve guide 56 has a radially outwardly extending flange 60 on the lower end thereof, and the flange 60 is clamped between the lower end of the inner tube 1 and the valve seat 55. The valve seat 55 has a plurality of circumferentially spaced legs 62 on the lower end thereof, and the legs 62 engage with the upper surface of the cap 6. Thus, the valve seat 55, the valve guide 56 and the inner tube 1 are mounted on the cap 6. The legs 62 define therebetween liquid passages 65 communicating the reservoir chamber C with the interior of the valve seat 55.

In the closed condition of the valve as illustrated in the right half of FIG. 8, the chamber B communicates with the reservoir chamber C through openings 59 and a central opening 59A in the valve guide 56, liquid passages 58A between the inner circumference of the valve guide 56 and the outer circumference of the valve body 52, an orifice opening defined by cut-outs formed in the outer circumference of the discs 53A and 53B, and the passages 65. Preferably, there are provided a plurality of circumferentially equally spaced cut-outs in respective discs 53A and 53B, and the spacing between respective cut-outs differ from that of the guide surfaces 58 of the valve guide 56 so that the effective area of the orifice is maintained constant irrespective to the relative angular position of the discs 53A and 53B and the valve guide 56. As compared with the embodiment of FIG. 3, it is advantageous to constitute the orifice of a plurality of restricted openings since when liquid forcibly flows through a single opening the aeration phenomenon will sometimes be observed and, accordingly, a uniform damping force cannot be obtained. Further, it is possible to prevent so-called swish sounds which generate when liquid flows through a restricted opening.

The operation of the hydraulic damper shown in FIGS. 7-10 is similar to that of FIGS. 1-6.

According to the invention, the bottom valve mechanism can effectively compensate for the decrease in the pressure of the gas enclosed in the hydraulic damper, and thus, a desired damping force can reliably be obtained during a long period of usage. Further, the ease of assembly and the durability of the damper can be improved, and fablication costs can be reduced.

The valve guide according to the invention has a plurality of circumferentially spaced guide surfaces on the inner circumference which smoothly guide the valve body, and define a plurality of circumferentially spaced and axially extending liquid passages around the circumference of the valve body. Thus, liquid flow in the valve opening condition is smooth. Further, the construction is simple.

What is claimed is:

1. In a hydraulic damper including generally vertically disposed coaxial inner and outer tubes, a piston working in said inner tube and partitioning the interior thereof into first and second liquid chambers, a piston rod secured to said piston and extending through said first liquid chamber to the outside of the damper through upper ends of said inner and outer tubes, a rod guide supporting the upper ends of said inner and outer tubes and slidably guiding said piston rod, a base cap supporting the lower ends of said inner and outer tubes, a reservoir chamber defined between said inner and outer tubes and containing therein liquid and gas, and a bottom valve mechanism mounted on said lower end of said inner tube for controlling liquid flow between said second liquid chamber and said reservoir chamber, the improvement wherein said bottom valve mechanism comprises:

a valve seat mounted on said lower end of said inner tube;

a valve body having an orifice passage;

a spring biasing said valve body toward said valve seat; and a valve guide guiding the movement of said valve body toward and away from said valve seat, said valve guide comprising a generally inverted U-shaped member having a lower end fitted on said valve seat, said U-shaped member including an axially extending imperforate skirt, a plurality of axially extending and circumferentially spaced indentations formed in the outer circumference to said skirt, said indentations forming on the inner circumference of said skirt a plurality of axially extending and circumferentially spaced guide surfaces in guiding contact with the outer circumferential surface of said valve body, said indentations further defining circumferentially therebetween a plurality of axially extending and circumferentially spaced liquid passages between said inner circumference of said skirt and said outer circumferential surface of said valve body, and said U-shaped member further including an upper base portion having therethrough a plurality of openings opening generally into respective said liquid passages.

* * * * *